United States Patent
Innes

(10) Patent No.: US 10,786,905 B1
(45) Date of Patent: Sep. 29, 2020

(54) TANK EXCAVATOR

(71) Applicant: AGI Engineering, Inc., Stockton, CA (US)

(72) Inventor: Alex G. Innes, Lodi, CA (US)

(73) Assignee: AGI Engineering, Inc., Stockton, CA (US)

( * ) Notice: Subject to any disclaimer, the term of this patent is extended or adjusted under 35 U.S.C. 154(b) by 0 days.

(21) Appl. No.: 16/385,804

(22) Filed: Apr. 16, 2019

Related U.S. Application Data

(60) Provisional application No. 62/658,178, filed on Apr. 16, 2018.

(51) Int. Cl.

| | |
|---|---|
| *B25J 11/00* | (2006.01) |
| *G21F 9/34* | (2006.01) |
| *B25J 5/00* | (2006.01) |
| *B08B 1/00* | (2006.01) |
| *G21F 9/30* | (2006.01) |
| *G21F 5/06* | (2006.01) |
| *G21F 5/005* | (2006.01) |

(52) U.S. Cl.
CPC ........... *B25J 11/0085* (2013.01); *B08B 1/005* (2013.01); *B25J 5/005* (2013.01); *G21F 5/005* (2013.01); *G21F 5/06* (2013.01); *G21F 9/30* (2013.01); *G21F 9/34* (2013.01)

(58) Field of Classification Search
CPC ....... B25J 11/0085; B25J 5/005; B08B 1/005; G21F 9/34; G21F 5/005; G21F 5/06; G21F 9/30
See application file for complete search history.

(56) References Cited

U.S. PATENT DOCUMENTS

| | | |
|---|---|---|
| 1,611,326 A | 12/1926 | Abbe |
| 2,461,433 A | 2/1949 | Moulten et al. |
| 2,611,523 A | 9/1952 | Aines |
| 2,668,625 A | 2/1954 | Garland |
| 2,669,941 A | 2/1954 | Stafford |
| 2,682,886 A | 7/1954 | Paxton |

(Continued)

FOREIGN PATENT DOCUMENTS

| | | |
|---|---|---|
| EP | 1166903 | 1/2002 |
| EP | 3151246 A1 | 4/2017 |

(Continued)

OTHER PUBLICATIONS

Oceaneering International, Inc., PCT Patent Application No. PCT/US18/080093, filed Nov. 9, 2018, Notification of Transmittal of the International Search Report and The Written Opinion of the International Searching Authority, or the Declaration dated Feb. 5, 2019, 3 pages.

(Continued)

*Primary Examiner* — David Redding
(74) *Attorney, Agent, or Firm* — Brian S. Steinberger; Hilary F. Steinberger; Law Offices of Brian S. Steinberger, P.A.

(57) ABSTRACT

Devices, apparatus, systems, vehicles and methods for cleaning contaminated tanks without introducing free water or liquefier into the tanks. A mobile vehicle with left and right sets of tracks can support a gathering arm assembly, a bucket assembly, an eductor vacuum, and a pump/tank assembly that can be used to remove and break up waste debris from a contaminated tank.

17 Claims, 17 Drawing Sheets

(56) References Cited

U.S. PATENT DOCUMENTS

| | | |
|---|---|---|
| 2,761,297 A | 9/1956 | Buchsteiner |
| 2,819,803 A | 1/1958 | Obenchain |
| 2,833,422 A | 5/1958 | Ferwerda et al. |
| 2,985,192 A | 5/1961 | Taylor et al. |
| 2,999,600 A | 9/1961 | Gates |
| 3,060,972 A | 10/1962 | Sheldon |
| 3,095,044 A | 6/1963 | Medlock |
| 3,116,021 A | 12/1963 | Born |
| 3,155,048 A | 11/1964 | Mandelbaum et al. |
| 3,161,490 A | 12/1964 | Dudek |
| 3,162,214 A | 12/1964 | Bazinet, Jr. |
| 3,190,286 A | 6/1965 | Stokes |
| 3,266,059 A | 8/1966 | Stelle |
| 3,274,850 A | 9/1966 | Tascio |
| 3,305,220 A | 2/1967 | Nevulis |
| 3,469,712 A | 9/1969 | Haulotte |
| 3,497,083 A | 2/1970 | Anderson et al. |
| 3,580,099 A | 5/1971 | Mosher |
| 3,585,620 A * | 6/1971 | Durand .................. G08B 23/00 340/540 |
| 3,599,871 A | 8/1971 | Ruppel |
| 3,757,697 A | 9/1973 | Phinney |
| 3,788,338 A | 1/1974 | Burns |
| 3,845,596 A | 11/1974 | Veenstra |
| 3,863,844 A | 2/1975 | McMillan |
| 3,889,818 A | 6/1975 | Wennerstrom |
| 3,932,065 A | 1/1976 | Ginsberg et al. |
| 3,951,572 A | 4/1976 | Ray, Jr. et al. |
| 4,106,671 A | 8/1978 | Sharples |
| 4,132,041 A | 1/1979 | Van Den Broek |
| 4,156,331 A | 5/1979 | Lester et al. |
| 4,250,933 A | 2/1981 | Olson |
| 4,339,232 A | 7/1982 | Campbell |
| 4,393,728 A | 7/1983 | Larson et al. |
| 4,396,093 A | 8/1983 | Zimmerman |
| 4,415,297 A | 11/1983 | Boring |
| 4,494,417 A | 1/1985 | Larson et al. |
| 4,540,869 A | 9/1985 | Yasuoka |
| 4,630,741 A | 12/1986 | Stevens |
| 4,661,039 A | 4/1987 | Brenholt |
| 4,685,349 A | 8/1987 | Wada et al. |
| 4,817,653 A * | 4/1989 | Krajicek .............. B08B 9/0933 134/168 R |
| 4,828,461 A | 5/1989 | Laempe |
| 4,839,061 A * | 6/1989 | Manchak, Jr. ........... B09C 1/00 210/170.01 |
| 4,848,179 A | 7/1989 | Ubhayakar |
| 4,944,535 A | 7/1990 | Maupin |
| 4,945,955 A | 8/1990 | Murphy |
| 4,977,790 A | 12/1990 | Nishi et al. |
| 5,007,803 A | 4/1991 | DiVito et al. |
| D326,336 S | 5/1992 | Christ |
| 5,118,230 A * | 6/1992 | Justice .................... E02D 17/13 405/129.6 |
| 5,172,710 A | 12/1992 | Harrington |
| 5,174,168 A | 12/1992 | Takagi et al. |
| 5,297,443 A | 3/1994 | Wentz |
| 5,439,020 A | 8/1995 | Lockhart |
| 5,451,135 A | 9/1995 | Schempf et al. |
| 5,515,654 A | 5/1996 | Anderson |
| 5,518,553 A | 5/1996 | Moulder |
| 5,540,172 A | 7/1996 | Goldbach et al. |
| 5,607,000 A | 3/1997 | Cripe et al. |
| 5,715,852 A | 2/1998 | Jepsen |
| 5,740,821 A | 4/1998 | Arnold |
| 5,830,752 A * | 11/1998 | Bruso ..................... B09C 1/00 435/283.1 |
| 5,913,320 A | 6/1999 | Varrin, Jr. et al. |
| 6,171,030 B1 * | 1/2001 | Miyake .................. E02D 3/005 37/142.5 |
| 6,213,135 B1 | 4/2001 | Moulder |
| 6,264,434 B1 | 7/2001 | Frank |
| 6,273,790 B1 | 8/2001 | Neese et al. |
| 6,280,408 B1 | 8/2001 | Sipin |
| 6,561,368 B1 | 5/2003 | Sturm, Jr. et al. |
| 6,651,837 B2 | 11/2003 | Stradinger et al. |
| 6,830,079 B1 | 12/2004 | Ahrens et al. |
| 6,889,920 B2 | 5/2005 | Nance et al. |
| 6,938,691 B2 | 9/2005 | Face |
| 7,021,675 B2 | 4/2006 | Lawson |
| 7,032,628 B2 | 4/2006 | Guillemette et al. |
| 7,037,040 B2 * | 5/2006 | Phillips .................. B09C 1/067 175/171 |
| 7,100,631 B2 | 9/2006 | Liu et al. |
| 7,241,080 B2 | 7/2007 | Klobucar et al. |
| 7,415,748 B1 * | 8/2008 | Guhr ..................... E01H 1/0836 15/340.1 |
| 7,708,504 B2 | 5/2010 | Heckendorn et al. |
| 7,998,251 B2 | 8/2011 | Pondelick et al. |
| 8,069,747 B2 | 12/2011 | Buckingham et al. |
| 8,191,202 B2 * | 6/2012 | Nuhn ..................... A01C 3/04 15/340.1 |
| 8,205,522 B2 | 6/2012 | Buckingham et al. |
| 8,347,563 B2 | 1/2013 | Anderson |
| 8,414,246 B2 | 4/2013 | Tobey |
| 8,702,399 B2 | 4/2014 | Krohn |
| 8,727,671 B2 | 5/2014 | Sundholm |
| 8,763,855 B1 | 7/2014 | Harvey et al. |
| 8,840,087 B2 | 9/2014 | Guyard |
| 9,195,238 B2 | 11/2015 | Roden et al. |
| 10,280,063 B2 | 5/2019 | Innes et al. |
| 10,406,571 B2 | 9/2019 | Innes et al. |
| 2002/0002426 A1 | 1/2002 | Burkhard |
| 2005/0025573 A1 | 2/2005 | Waldman et al. |
| 2005/0109376 A1 | 5/2005 | Gregory |
| 2005/0166413 A1 | 8/2005 | Crampton |
| 2006/0054189 A1 | 3/2006 | Luke et al. |
| 2006/0054202 A1 | 3/2006 | Luke et al. |
| 2008/0040945 A1 * | 2/2008 | Buckner ............... E02F 3/8816 34/406 |
| 2008/0148876 A1 | 6/2008 | Hock et al. |
| 2010/0196129 A1 * | 8/2010 | Buckner ............... E02F 3/8825 414/467 |
| 2010/0221125 A1 | 9/2010 | Fulkerson et al. |
| 2010/0234988 A1 | 9/2010 | Buckingham et al. |
| 2010/0264013 A1 | 10/2010 | Burton |
| 2011/0186657 A1 | 8/2011 | Haviland |
| 2011/0315165 A1 | 12/2011 | McWhorter |
| 2012/0106882 A1 | 5/2012 | Ponnouradjou et al. |
| 2012/0279537 A1 | 11/2012 | Peeters et al. |
| 2014/0079573 A1 | 3/2014 | Pabst |
| 2015/0034176 A1 | 2/2015 | Garcia Arguelles et al. |
| 2015/0124242 A1 | 5/2015 | Pierce et al. |
| 2015/0362000 A1 | 12/2015 | Schmidt et al. |
| 2016/0055268 A1 | 2/2016 | Bell et al. |
| 2016/0107207 A1 | 4/2016 | Desormeaux |
| 2017/0173617 A1 | 6/2017 | Zilai et al. |
| 2017/0259309 A1 | 9/2017 | Innes et al. |

FOREIGN PATENT DOCUMENTS

| | | |
|---|---|---|
| IN | 201741036558 | 10/2017 |
| JP | 2004301665 A | 10/2004 |
| WO | 2009018599 | 2/2009 |
| WO | 2014019852 A1 | 2/2014 |

OTHER PUBLICATIONS

Innes, Alex. G., PCT Patent Application No. PCT/US/19/036567, filed Jun. 11, 2019, Notification of Transmittal of the International Search Report and the Written Opinion of the International Search Authority, or the Declaration dated Sep. 17, 2019, 8 pages.

Lane, et al. "FY10 Engineering Innovations, Research and Technology Report" In: Lawrence Livermore National Lab. Jan. 31, 2011 (Jan. 31, 2011) retrieved on Aug. 10, 2019 (Aug. 10, 2019) from https://e-reports-ext.llnl.gov/pdf/461932.pdf, 99 pages.

Bullseye Pumps, Bullseye B200-SPDK Vacuum Loading Solids Pump, 2017, retrieved from http://www.bullseyepumps.com/products/bullseye-b200-spdk-vacuum-loading-solids-pump?variant=31478670788, 10 pages.

(56) References Cited

OTHER PUBLICATIONS

Sykes Pumps, General Purpose, GP50 Pump Performance, 2017, retrieved from http://www.sykespumps.com.sa/pumps/product-specs/gp_50_75.html, 2 pages.
Pentair Southern Cross, SX60 Portable Slurry Pump, 2017, retrieved from http://www.southerncross.pentair.com.au/product/market/pumps/vacuum-pumps/sx60-portable-slurry-pump/, 3 pages.
Wastecorp. Pumps, Super Duty. TVP-65 Series Vacuum Pumps, 2017, brochure, 1 page.
RITCHIESpecs, Gradall 534D-9-45 Telescopic Forklift, 2017, retrieved from www.ritchiespecs.com, 2 pages.
Boom, Gradall Material Handler 534 D-6/534 D-6 Turbo, Jul. 2002, 1 page.
Manitowoc. National Crane 600H Series Product Guide, 2012, 16 pages.
Manitowoc, National Crane 680H-TM, Aug. 2015, 4 pages.
FESTO, Bionic Handling Assistant, Apr. 2012, 6 pages.
Schutz. Maxon Motor, Robotic Snake-Arm Files into Tight Spaces, 2012, 4 pages.
McMahan, W., et al., Field Trials and Testing of the OctArm Continuum Manipulator, IEEE, May 2006, pp. 2336-2341, 6 pages.
Li, Z., et al., A Novel Tele-Operated Flexible Robot Targeted for Minimally Invasive Robotic Surgery, Engineering Research Robotics Article, Mar. 2015, pp. 073-078, vol. 1, Issue 1, 6 pages.
Li, Z., et al., Kinematic Comparison of Surgical Tendon-Driven Manipulators and Concentric Tube Manipulators, Mechanism and Machine Theory, 2017, pp. 148-165, vol. 107, 18 pages.
Military Elevation Solutions and Tactical Trailers, KVL and KVR Telescopic Cable-Drive Masts, Sep. 2016, 3 pages.
OCRobotics, Laser Snake 2, Snake-arm robot and high-power laser integration, www.ocrobotics.com, 2016, 4 pages.
OCRobotics, Nuclear decommissioning case-study: Laser Snake, Snake-arm robot and high-power laser integration, www.ocrobotics.com, 2016, 4 pages.
Bauer, et al., Development and deployment of the Extended Reach Sluicing System (ERSS) for Retrieval of Hanford Single Shell Tank Waste—14206 (Draft), U.S. Department of Energy, Assistant Secretary for Environmental Management, Washington River Protection Solutions, Nov. 2013, 19 pages.
Innes, PCT Patent Application No. PCT/US17/18120 filed Feb. 16, 2017, Notification of Transmittal of the International Search Report and the Written Opinion of the International Searching Authority, or the Declaration dated May 10, 2017, 14 pages.
Innes, PCT Patent Application No. PCT/US17/18120 filed Feb. 16, 2017, Notification Concerning Transmittal of International Preliminary Report on Patentability, 12 pages.
Pearson, M.J., et al., "Biomimetic Vibrissal Sensing for Robots," Philosophical Transactions of the Royal Society B (2011), vol. 366, pp. 3085-3096, 12 pages.
Innes, Alex. G., PCT Patent Application No. PCT/US/19/068359, filed Dec. 23, 2019, Notification of Transmittal of the International Search Report and the Written Opinion of the International Search Authority, or the Declaration dated Feb. 25, 2020, 14 pages.

\* cited by examiner

TANK EXCAVATOR

RELATED APPLICATIONS

This application claims the benefit of priority to U.S. Provisional Patent Application Ser. No. 62/658,178 filed Apr. 16, 2018, which is incorporated by reference in its' entirety.

FIELD OF INVENTION

This invention relates to tank cleaning, and in particular to devices, apparatus, systems, vehicles and methods for cleaning contaminated tanks without free water tanks having high temperature, low temperature conditions, high doses of radiation, and flammable liquids or vapors.

BACKGROUND AND PRIOR ART

Radioactive material is stored in hundreds of underground storage tanks at the United States Department of Energy's sites such as Savannah River, The Hanford Site in Eastern Washington State, USA and elsewhere around the world. A problem occurs when it is time to clean up the inside of these known leaking tanks.

Since 2001 equipment developed and manufactured by AGI Engineering of Stockton, Calif., has been used to break up and retrieve the material located in these tanks. Existing technology used to clean most tanks containing chemical, radioactive and/or hazardous materials or other waste relies primarily on the use of water or water based liquefiers to break up waste so it can be pumped out of the tanks.

In many cases the use of water or fluids as liquefier poses significant challenges. For instance, if a tank is known or suspected of having structural flaws any system requiring large volumes of free fluid in the tank provides potential for leakage into the environment that may carry contaminated material with it which then contaminate neighboring properties as well as subterranean and potentially underground water. Additionally, the use of fresh water or water based liquefier costs money and resources and also produces large quantities of contaminated liquefier that will then have to be treated and disposed of.

Thus, the need exists for solutions to the above problems with the prior art.

SUMMARY OF THE INVENTION

A primary objective of the present invention is to provide devices, apparatus, systems, vehicles and methods for cleaning liquids, sludges, and solid nuclear waste from contaminated tanks, and further, breaking down and classifying the waste in to small particles without introducing free liquid, water or liquefier into the tanks.

The Tank Excavator primarily is a self propelled mechanical device that break up and collects material from inside chemical, radioactive and/or hazardous tanks. The use of interchangeable tooling allows broken, fouled, or jammed assemblies to be replaced, and allows tool selection to be tailored to the specific waste being encountered.

In order to fit though a minimal round opening, as small as approximately 34" in diameter, the Tank Excavator can be folded into a stowed position and unfolded into an operating position after deployment in the tank.

The invention can be remotely operated for use in radioactive and/or flammable environments.

A preferred embodiment of a tank excavator device for cleaning contaminated tanks, can include a mobile vehicle having a front end and a rear end, a gathering arm assembly having a first end and a second end attached to the front end of mobile vehicle, the first end for breaking up waste from a contaminated waste tank, a bucket assembly on the front end of the mobile vehicle, having a receptacle for collecting the waste from the first end of the gathering arm assembly, and a pump and tank assembly adjacent a rear end of the mobile vehicle, for collecting waste material in the bottom of the contaminated waste tank with a pump.

The mobile vehicle can include a first pair of wheels with a first track of parallel tank threads on a left side of the mobile vehicle, and a second pair of wheels with a second track of parallel tank threads on a right side of the mobile vehicle.

The gathering arm assembly can include a scraper on the first end of the gathering arm assembly, and a plurality of hardened tines attached to the scraper.

The plurality of hardened tines can be reciprocated linearly up and down through pneumatic actuation.

The plurality of hardened tines can be reciprocated linearly up and down through hydraulic actuation.

The gathering arm assembly can include a scraper with squeegee on the first end of the gathering arm assembly.

The gathering arm assembly can include a scraper with squeegee and grinding drum assembly on the first end of the gathering arm assembly.

The gathering arm assembly can include a pivotable mast with a lover end pivotally attached to the front end of the mobile vehicle, and an upper end, and a boom having a first end pivotally attached the upper end of the mast, and a second end pivotally attached to a base of a scraper.

The gathering arm assembly can include a mast elevation cylinder having a lower end pivotally attached to the vehicle and an upper end pivotally attached to an upper portion of the pivotable mast for controlling pivoting positions of the pivotable mast relative to the mobile vehicle, and a boom elevation cylinder for having a first end pivotally attached to another upper portion of the pivotal mast and a second end pivotally attached to another portion of the base of the scraper.

The bucket assembly can include pivoting arms for allowing the bucket assembly to pivot up or pivot down relative to the front end of the mobile vehicle.

The bucket assembly can include a ramp having a front end which is lowerable to rest on a surface, and a rear end that rises up to the receptacle.

The bucket assembly can include a trough in the receptacle that gravity feeds a screw which feeds the collected waste material into an educator.

The bucket assembly can include a crusher in the receptacle for further breaking down the collected waste material.

The bucket assembly can include a macerator in the receptacle for further breaking down the collected waste material.

The bucket assembly can include a jet educator for pushing broken down material from the collected waste to the pump and tank assembly.

The tank excavator can include an electrical and controls assembly having onboard controls and hydraulic valves housed in explosion proof enclosures, and communications for the electrical and controls assembly over fiber optics.

The electrical and controls assembly can include electrical power is provided by an on-board fluid powered generator.

The electrical and controls assembly can include electrical power provided by an on-board pneumatic powered generator.

The tank excavator can include an electrical and controls assembly that includes explosion proof hydraulic valves located. outside the contaminated waste tank.

Another embodiment of the tank excavator device for cleaning contaminated tanks, can include a mobile vehicle having a front end and a rear end, a gathering arm assembly having a first end and a second end attached to the front end of mobile vehicle, the first end for breaking up waste from a contaminated waste tank, a bucket assembly on the front end of the mobile vehicle, having a receptacle for collecting the waste from the first end of the gathering arm assembly, pivoting arms for allowing the bucket assembly to pivot up or pivot down relative to the front end of the mobile vehicle, a pump and tank assembly adjacent a rear end of the mobile vehicle, for collecting waste material from the discharge of an eductor in the bottom of the bucket assembly in order to pump the waste material out of the waste tank, a scraper on the first end of the gathering arm assembly, a pivotable mast with a lower end pivotally attached to the front end of the mobile vehicle, and an upper end, and a boom having a first end pivotally attached the upper end of the mast, and a second end pivotally attached to a base of the scraper.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1:
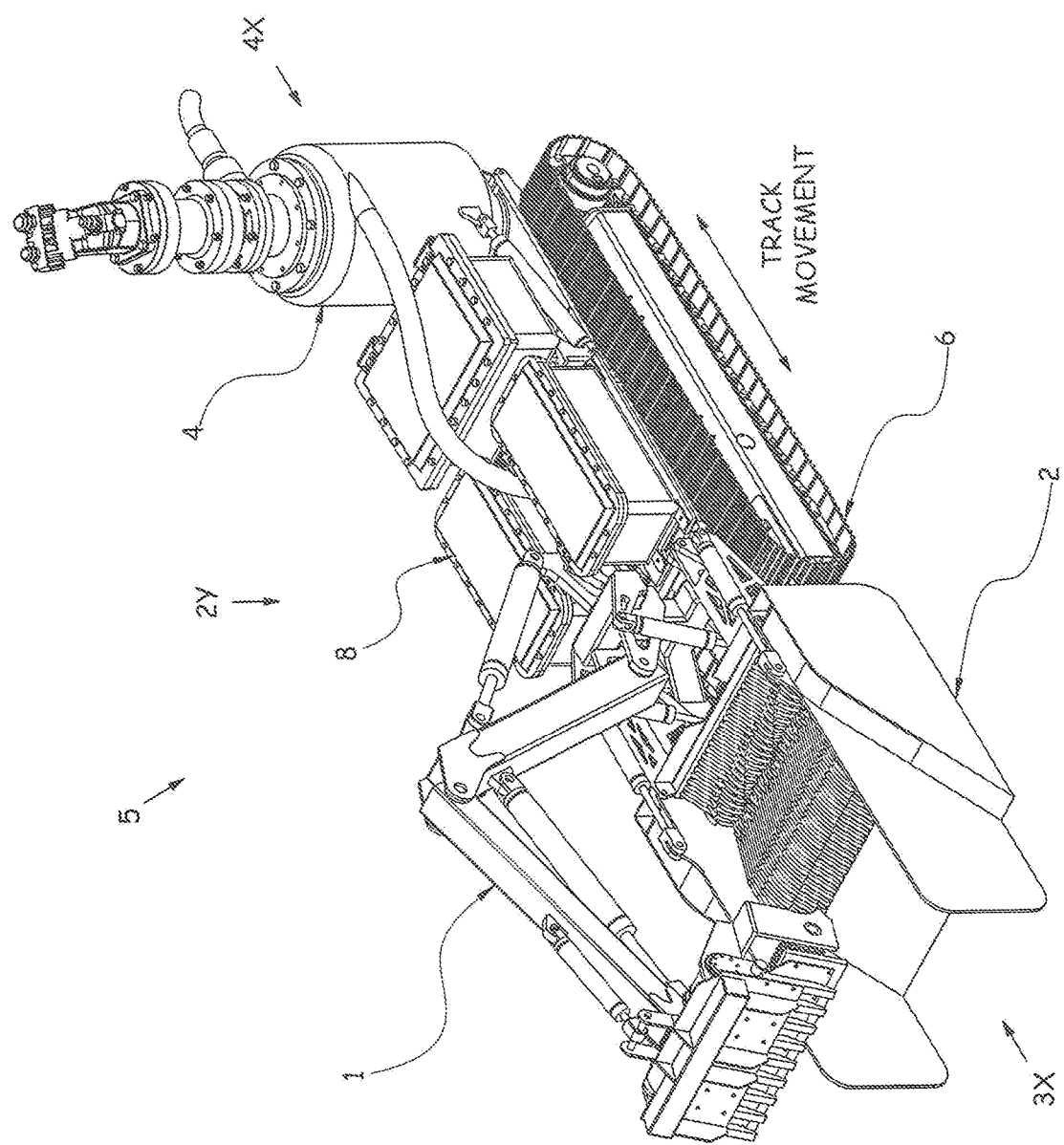
FIG. 1 is an isometric view of the tank excavator

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

A listing of the components will now be described.

Figure 2:
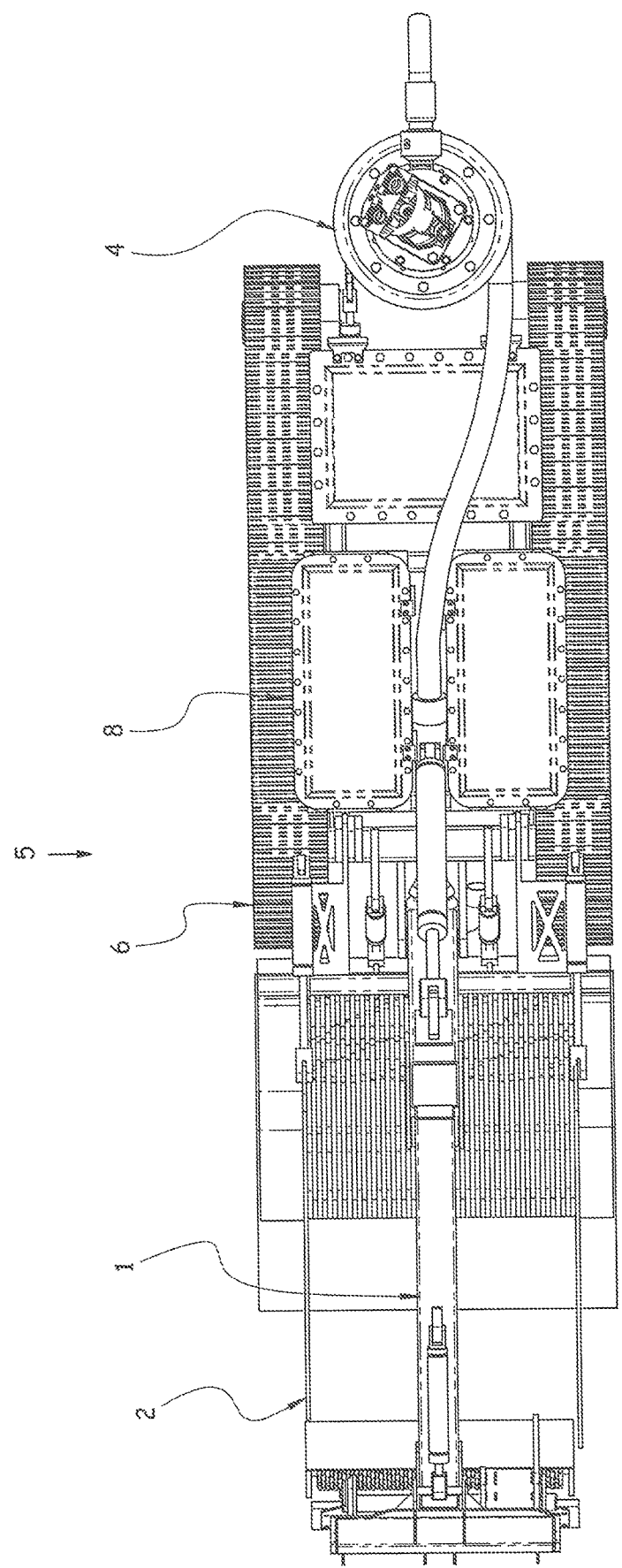
FIG. 2 is a top view of the tank excavator of FIG. 1 along arrow 2Y.
Figure 3:
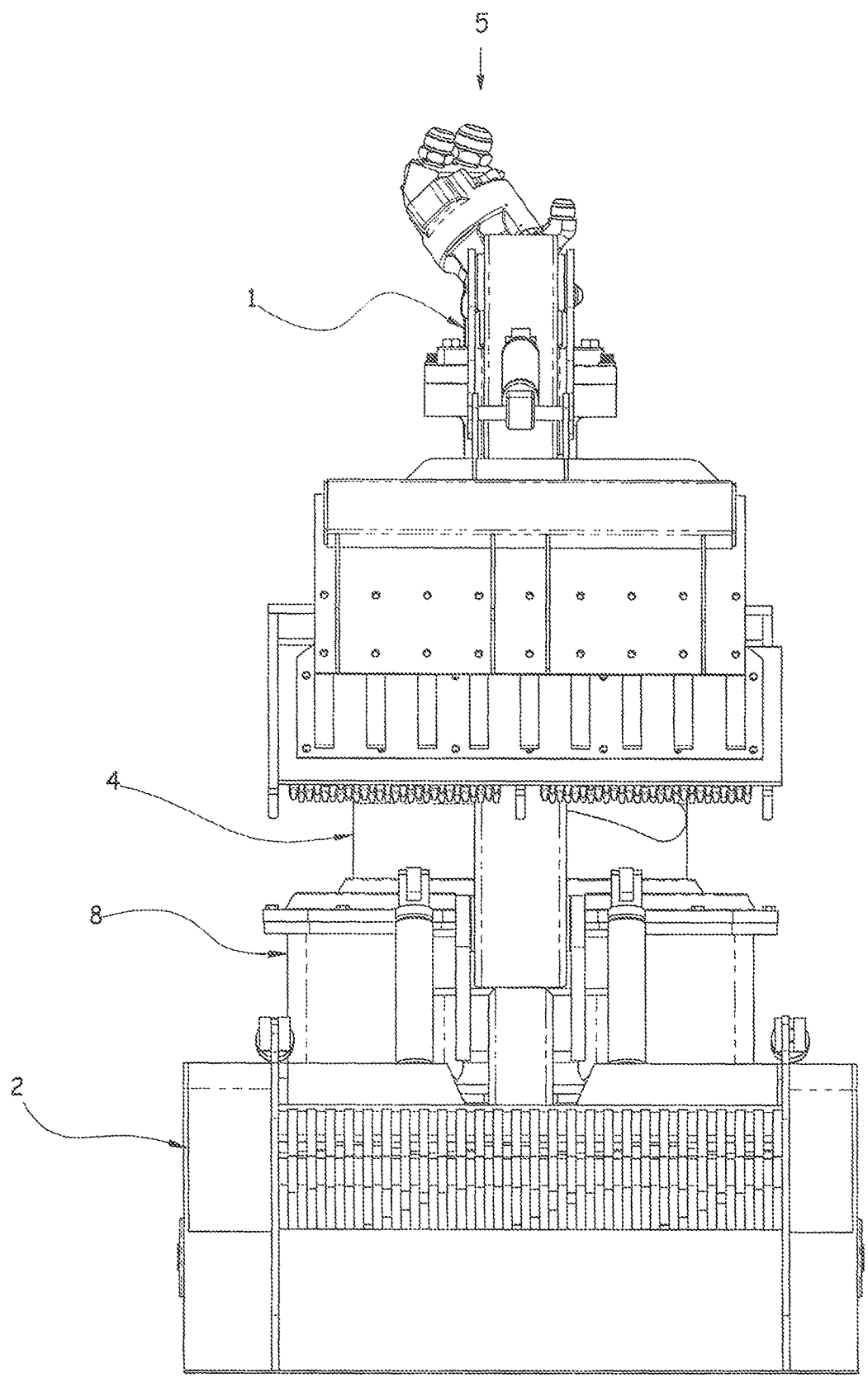
FIG. 3 is a front end view of the tank excavator of FIG. 1 along arrow 3X.
Figure 4:
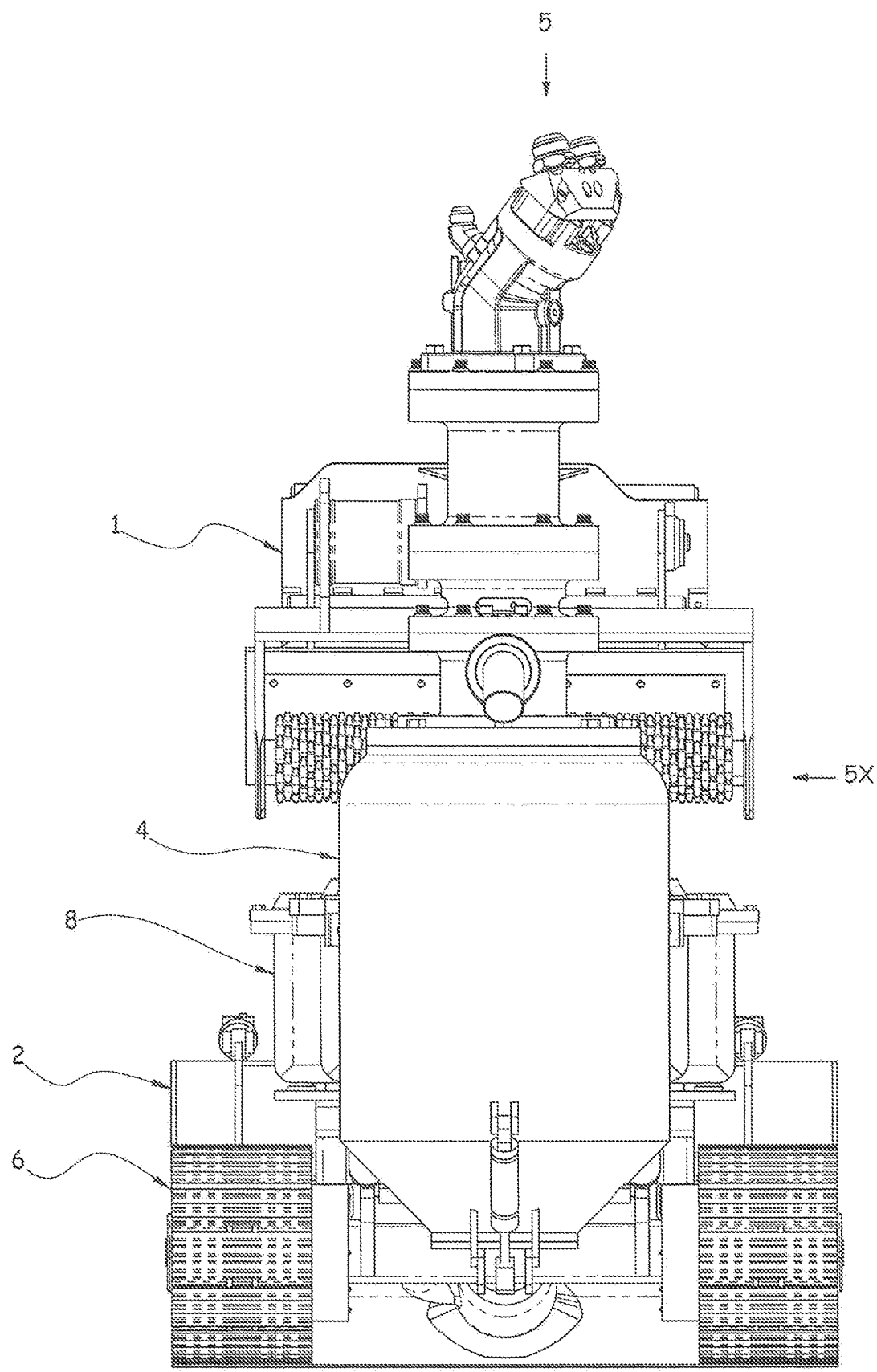
FIG. 4 is a rear end view of the tank excavator of FIG. 1 along arrow 4X.
Figure 5:
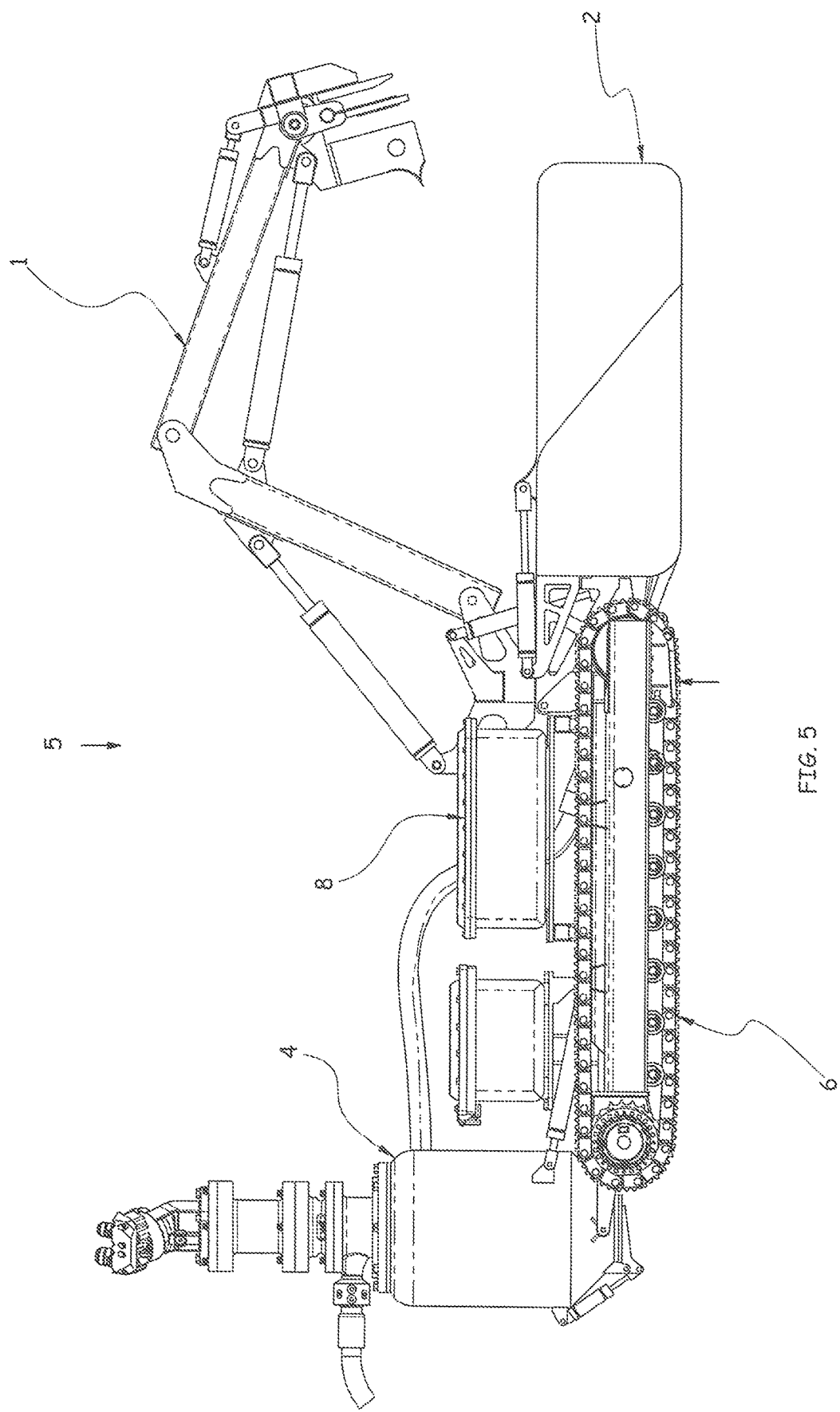
FIG. 5 is a right side view of the tank excavator of FIG 4 along arrow 5X.
Figure 6:
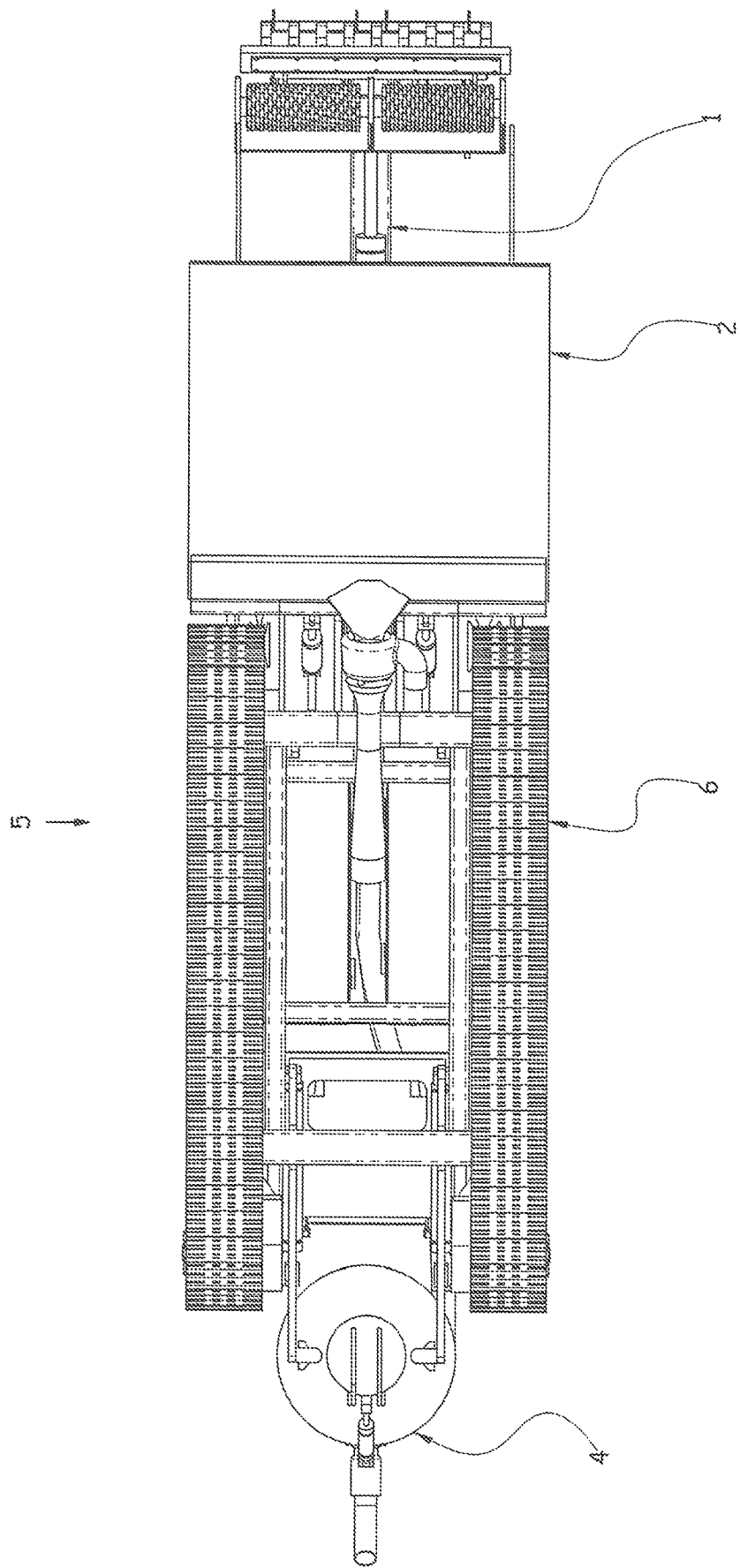
FIG. 6 is a bottom view of the tank excavator of FIG. 5 along arrow 6Y.

1 gathering arm
2 bucket assembly
4 pump and tank assembly
5 Tank excavator
6 track assembly
8 electrical and control assembly
10 pivotal mast
12 mast elevation cylinder
14 boom
16 boom elevation cylinder
18 scraper assembly
19 upper end of mast
20 scraper elevation cylinder
21 first end of boom 22 tines
23 first end of boom elevation cylinder
24 squeegee assembly
25 second end of boom elevation cylinder
26 grinding drum/assembly
27 second end of boom
28 hydraulically driven grinding drum
29 first end of scrapper elevation cylinder
30 outboard support plates
31 second end of scrapper elevation cylinder
32 intermediate support plate
40 ramp
41 first end of bucket
42 screw conveyor
43 front end of mobile vehicle
44 eductor
45 second end of mobile vehicle
46 bucket elevation cylinder
50 drums
52 bucket rotation cylinder
54 wedge wire screen
56 jets
60 tank
62 pump
64 pump discharge outlet
66 hydraulic motor
68 trap door drain valve
70 trap door cylinder
72 tank elevation cylinder
80 articulation nozzle
82 low flow nozzle
84 high flow nozzle
86 hydraulic motor 100 Pump/tank assembly
102 hose 104
104 tank excavator FIG. 1 is an isometric view of the tank excavator 5. FIG. 2 is a top view of the tank excavator 5 of FIG. 1 along arrow 2Y. FIG. 3 is a front end view of the tank excavator 5 of FIG. 1 along arrow 3X. FIG. 4 is a rear end view of the tank excavator 5 of FIG. 1 along arrow 4X. FIG. 5 is a right side view of the tank excavator 5 of FIG. 4 along arrow 5X. FIG. 6 is a bottom view of the tank excavator 5 of FIG. 5 along arrow 6Y.

Referring to FIGS. 1-6, the tank excavator 5 can include a mobile vehicle comprised of a gathering arm 1, bucket assembly 2, pump and tank assembly 4, track assembly 6, and electrical and control assembly 8.

A. Gathering Arm Assembly 1

Figure 7:
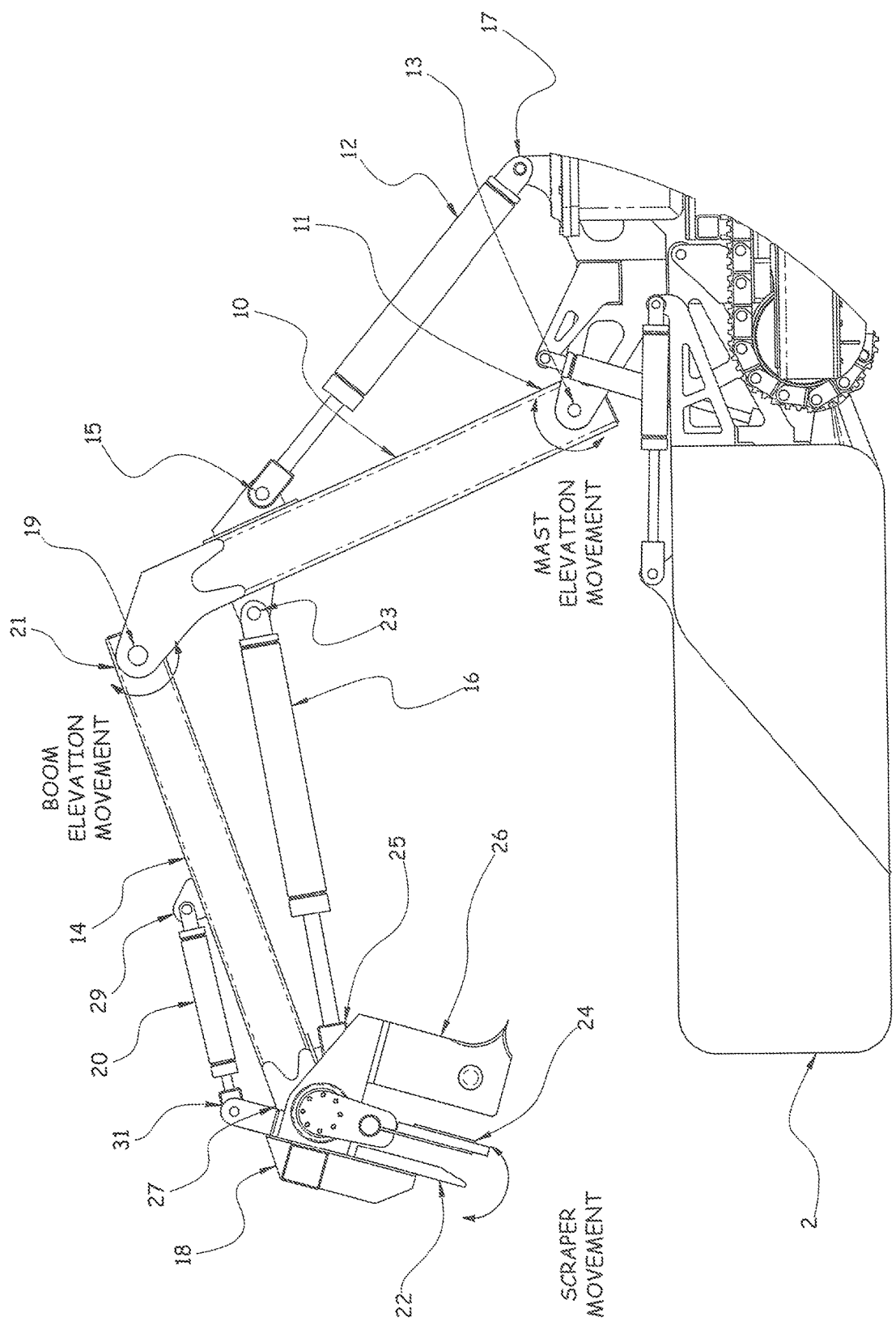
FIG. 7 is an enlarged view of the gathering arm detail portion of FIG. 7.

FIG. 7 is an enlarged view of the gathering arm detail portion of FIG. 7. Referring to FIG. 7, the gathering arm assembly 1 can be used to break up waste and pull it into the bucket assembly 2.

The gathering arm assembly can include a pivotable mast 10 with a lower end 11 pivotally attached to the front end 13 of the mobile vehicle and an upper end 15 pivotally attached to a mast elevation cylinder 12 in turn having a lower end 17 pivotally attached to the mobile vehicle for controlling pivoting positions of the pivotable mast 10 relative to the mobile vehicle. The upper end 19 of the mast 10 can also pivotably attached to a first end 21 of a boom 14 and a first end 23 of a boom elevation cylinder 16. The boom elevation cylinder 16 can have a second end 25 pivotably attached to the second end 27 of the boom 14 for controlling pivoting positions of the pivotable boom 14 relative to the mast 10. The boom 14 can have a second end 27 pivotably attached to a base of the scraper assembly 18 and a first end 29 of a scraper elevation cylinder 20. The scraper elevation cylinder 10 can have a second end 31 pivotably attached to the base of the scraper assembly 18 for controlling pivoting positions of the scraper assembly 18 relative to the boom 14.

The second end of the scraper assembly 18 can be comprised of a plurality of tines 22 used to break waste into smaller particles and pull them into the bucket assembly 2. These tines 22 can be round, square or rectangular in cross section and constructed from any carbon, alloy, tool, or stainless steel in the annealed, tempered or hardened state. In certain embodiments, the tines are spring loaded and incorporate a vibrating or reciprocating motion through hydraulic or pneumatic actuation to provide a jackhammer functionality. The travel of the tines can be limited so as not to engage and damage the tank floor. In an alternate embodiment, the tines can be replaced with a flat plate.

Figure 8:
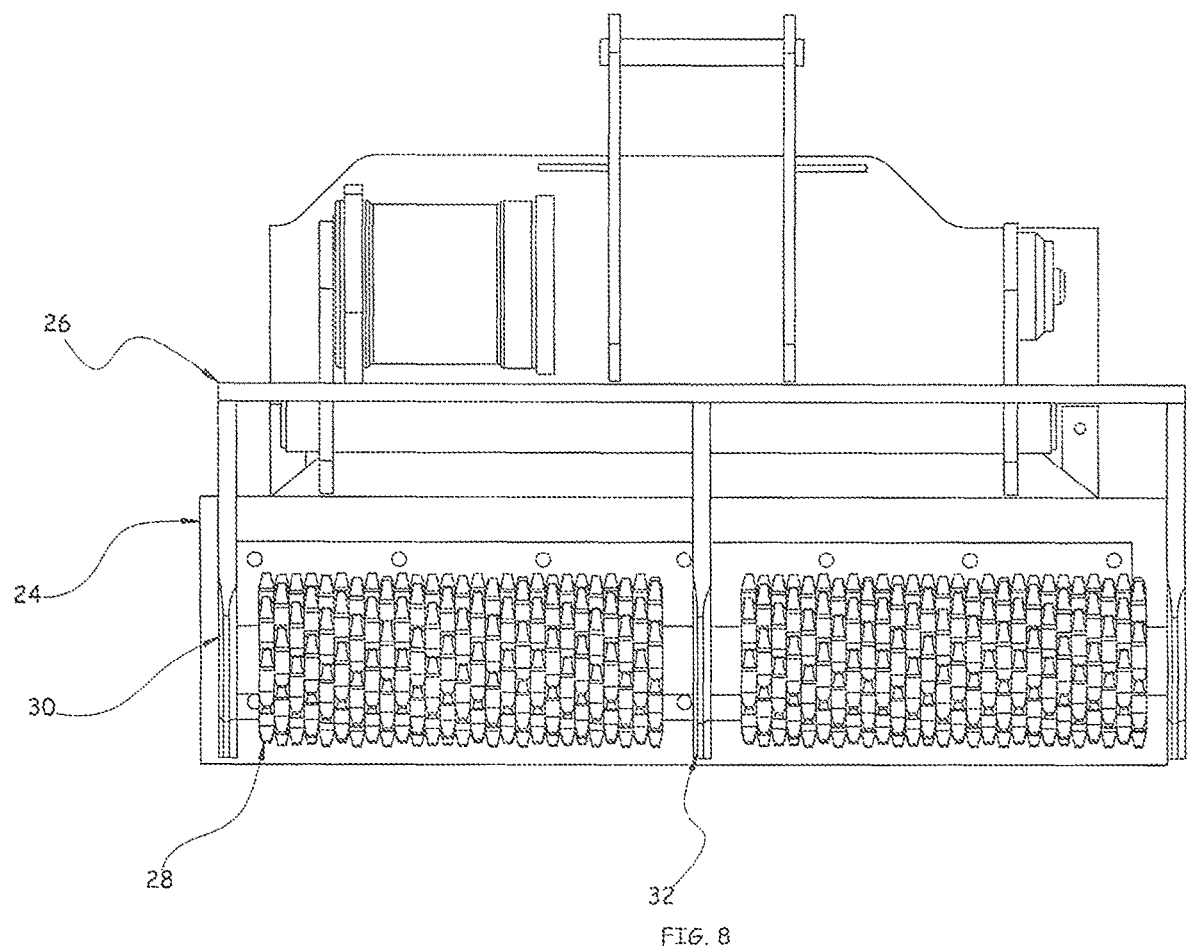
FIG. 8 is a front view of the grinding assembly.

FIG. 8 is a front view of the grinding assembly used in the tank excavator 5 shown in FIG. 1. In a further embodiment, a flip down rubber squeegee assembly 24 improves the excavator's ability to pull liquid or light slurries into the bucket assembly 2.

In an even further embodiment, FIG. 8 illustrates a grinding drum assembly 26 that can include hydraulically driven grinding drum 28 with teeth, spaced in an offset pattern about the circumference, can provide a surface grinding action. The teeth can be fabricated from any carbon, alloy, tool, or stainless steel in the annealed, tempered or hardened state. In a further embodiment, the teeth can be carbide or carbide tipped. The drum is supported by bearings mounted in two outboard support plates 30 and an intermediate plate 32. These plates 30, 32 can extend past the perimeter of the teeth of the grinding drum 26 to prevent damage though contact between the drum and the floor of a tank. On the leading edge of the plates, a sharpened edge provides means to cut through waste as the gathering arm is dragged through the waste. The drum can be rotated about its longitudinal axis through a hydraulic motor. The grinding drum assembly 26 can be fixed or, in another embodiment, coupled to a rotary actuator for independent movement.

The scraper assembly 18 can be equipped with just the tines, just the squeegee assembly, just the grinding drum assembly 26, or any combination therein.

B. Bucket Assembly 2

Figure 9:
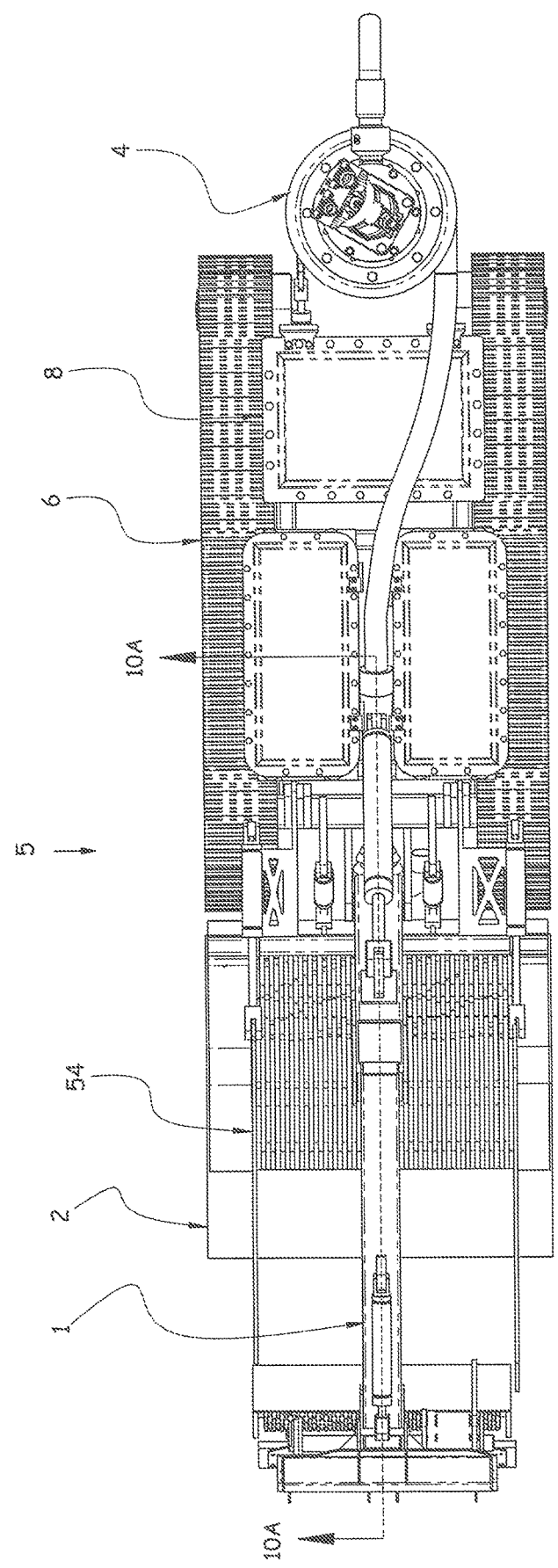
FIG. 9 is an enlarged view of the view of the tank excavator of FIG. 2.
Figure 10A:
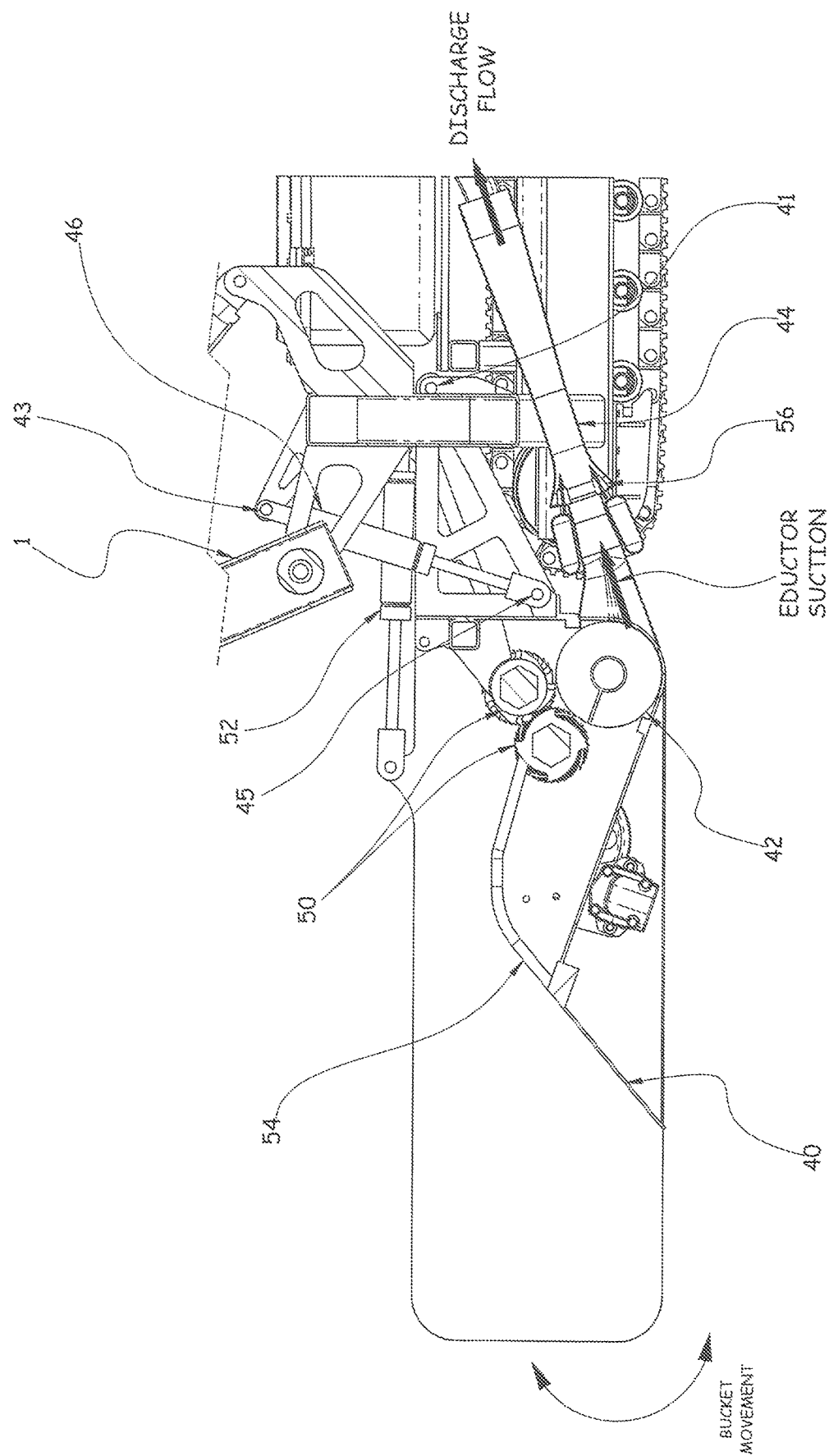
FIG. 10A is a partial cross-sectional view of the bucket section of the tank excavator of FIG. 9 along arrows 10A.

FIG. 9 is an enlarged view of the top view of the tank excavator 5 of FIG. 2. FIG. 10A is a partial cross-sectional view of the bucket section of the tank excavator 5 of FIG. 9 along arrows 10A.

Referring to FIGS. 9 and 10A, the bucket assembly 2 can provide a receptacle for the waste gathered by the Gathering Arm assembly 1. Waste is pulled up the ramp 40 of the bucket and collected in a trough area. The trough gravity feeds a centering screw conveyor 42, which pushes the waste into the throat of an eductor 44.

The bucket assembly 2 can be pivotably attached to the front end of the mobile vehicle. A first end 41 of a bucket elevation cylinder 46 can also be pivotably affixed to the front end 43 of the mobile vehicle with the second end 45 pivotably attached to a point near the first end of the bucket assembly 2 for up and down adjustment in order to accommodate vehicle movement through varying waste depths as well as to provide increased ground clearance for maneuverability across rough terrain.

A macerator or crusher assembly can be included above the centering screw conveyor 42 in order to classify and further break down the material to prevent eductor fouling, allow passage through pumps and meet downstream waste processing requirements. The macerator can be comprised of two opposing drums 50 with teeth, spaced in an offset pattern about the circumference. The teeth can be fabricated from any carbon, alloy, tool, or stainless steel in the annealed, tempered or hardened state.

In a further embodiment, the teeth can be carbide or carbide tipped. The drums are axially spaced such that the teeth come in close proximity in order to classify into pieces safe for pumps and other process equipment. The drums are driven through a hydraulic motor.

The drums 50 can rotate in opposing directions and draws the waste through towards the screw conveyor 42. The drums 50 can also be reversed to eject any nuts, bolts, or material that can foul the drums.

Figure 10B:
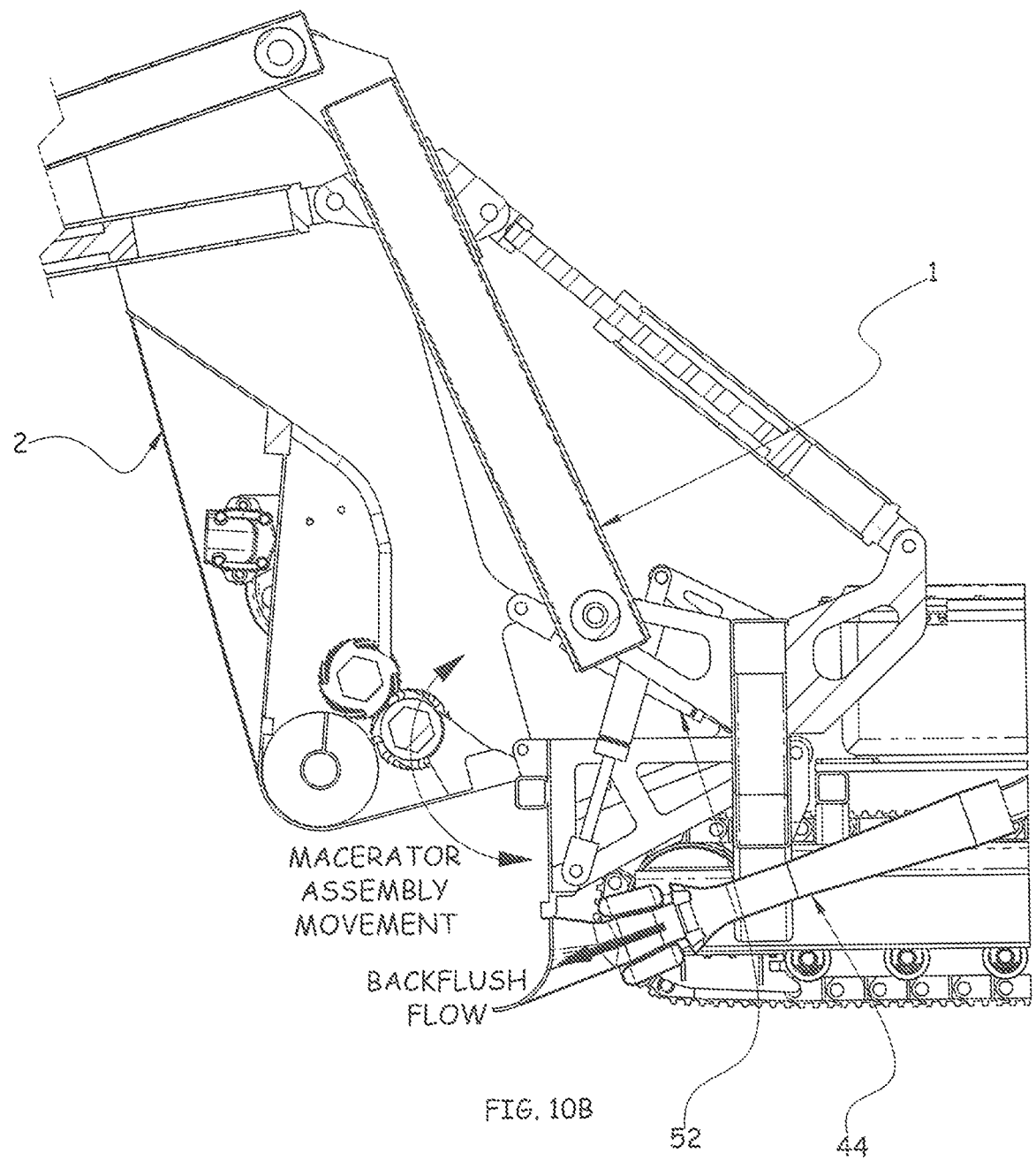
FIG. 10B is another partial, cross-sectional view of the bucket open section of the tank excavator of FIG. 9 along arrows 10A.

FIG. 10B is another partial, cross-sectional view of the bucket open section of the tank excavator 5 of FIG. 9 along arrows 10A.

Referring to FIGS. 9 and 10A-10B, a bucket rotation cylinder 52 can pivot the bucket assembly relative to the mobile vehicle as illustrated in FIG. 10B. in order to allow the bucket to be cleared of debris and the eductor 44 to be back flushed.

A parallel bar wedge-wire screen 54 in front of the macerator and/or crusher allows material that is already small enough to pass through the eductor, pump, and other process equipment to bypass the macerator and/or crusher. This prolongs the life of these components and increases the available system throughput.

Perimeter jets 56 on the eductor 44 can use pressurized liquefier to provide vacuum on the educator inlet to draw the material in from the centering screw conveyor, while providing positive pressure on the educator outlet to push this material into the Pump/Tank Assembly. The perimeter jet configuration provides an unobstructed throat, helping to prevent fouling and allow for back flushing.

C. Pump/Tank Assembly 4

Figure 11:
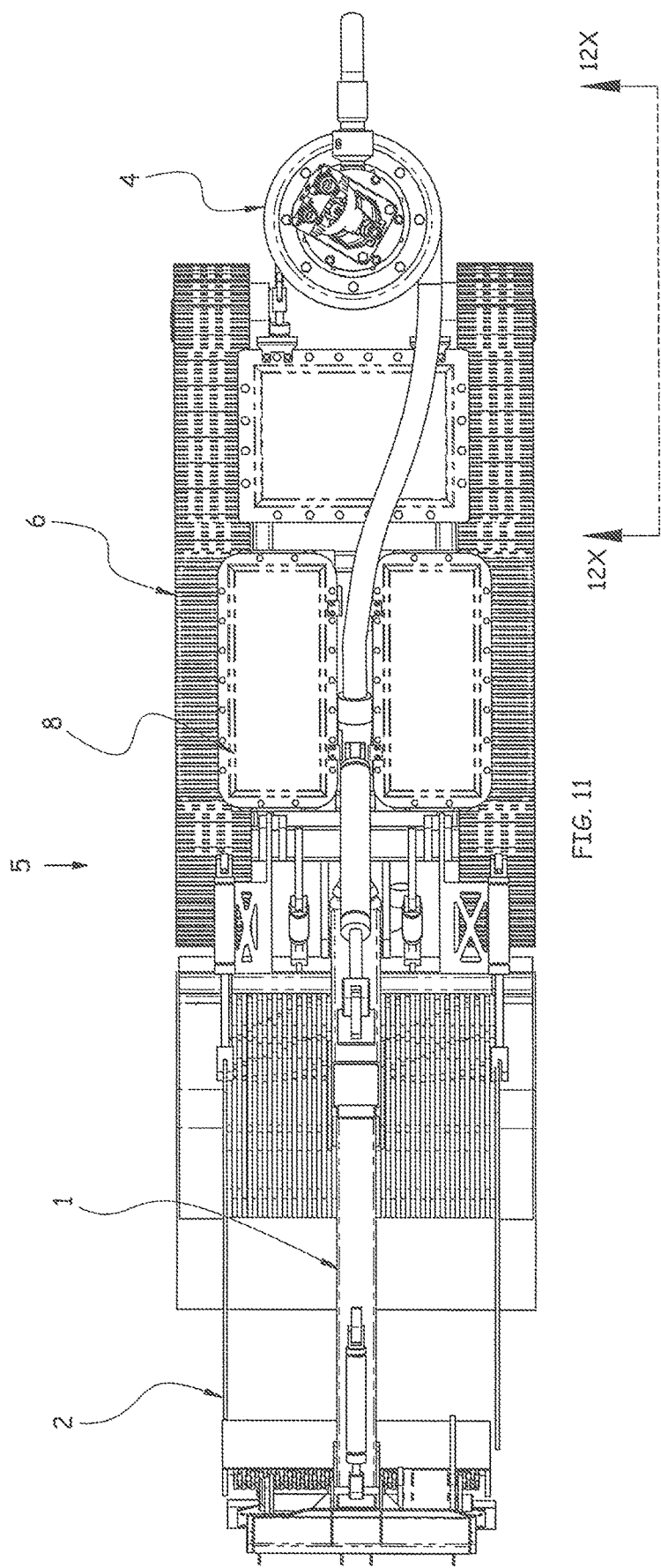
FIG. 11 is another top view of the tank excavator of FIG. 1.
Figure 12:
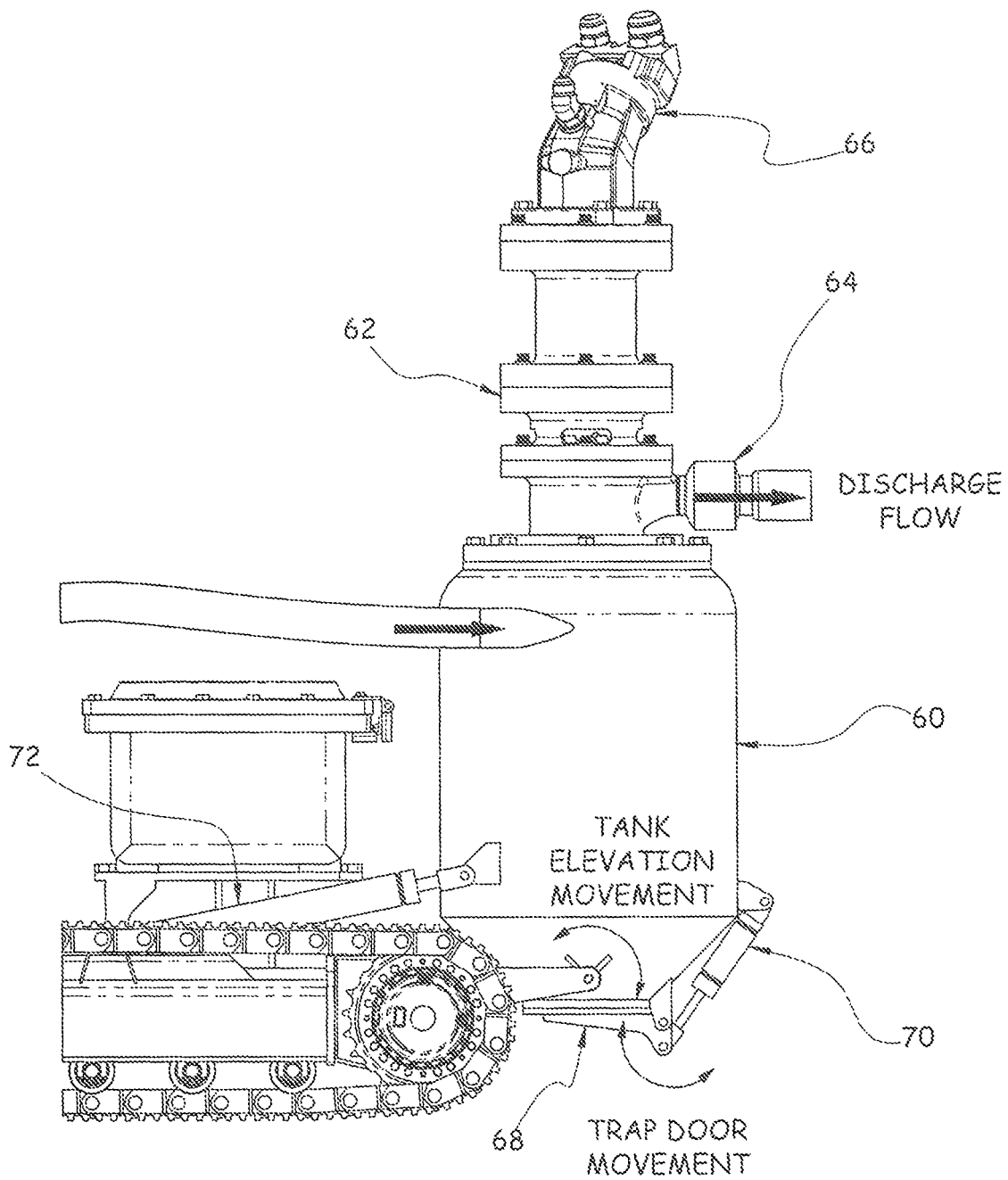
FIG. 12 is a partial, side view of the pump/tank assembly detail of FIG. 11 along arrows 12X.

FIG. 11 is another top view of the tank excavator 5 of FIG. 1. FIG. 12 is a partial, side view of the pump/tank assembly detail 4 of FIG. 11 along arrows 12X.

Referring to FIGS. 11-12, the Pump/Tank Assembly 4 can collect the material in the bottom of the tank 60. Because of the limited pumping capability of any eductor, a pump 62 within the tank 60 can provide the proper discharge pressure and flow required to pump the retrieved material out of the waste tank 60, out of the pump discharge outlet 64, and to the new double shell storage tank where the waste can be stored safely prior to processing. The pump 62 can be driven through a hydraulic motor 66 for operation in environments with hazardous vapors.

The Pump/Tank assembly 4 can be furnished with a trap door drain valve 68 at the bottom. A trap door cylinder 70 can have a first end pivotally attached to the base of the tank 60 and a second end pivotally attached to the base of the trap door 68 such that the drain can be opened to backflush the pump 62 and tank 60 and eliminate any solids that may cause fouling.

A. tank elevation cylinder 72 with a first end pivotally can be attached to the back end of the mobile vehicle and a second end pivotally attached to a lower end of the tank 60 in order to control the pivoting position of the tank assembly 4 relative to the mobile vehicle.

Figure 12A:
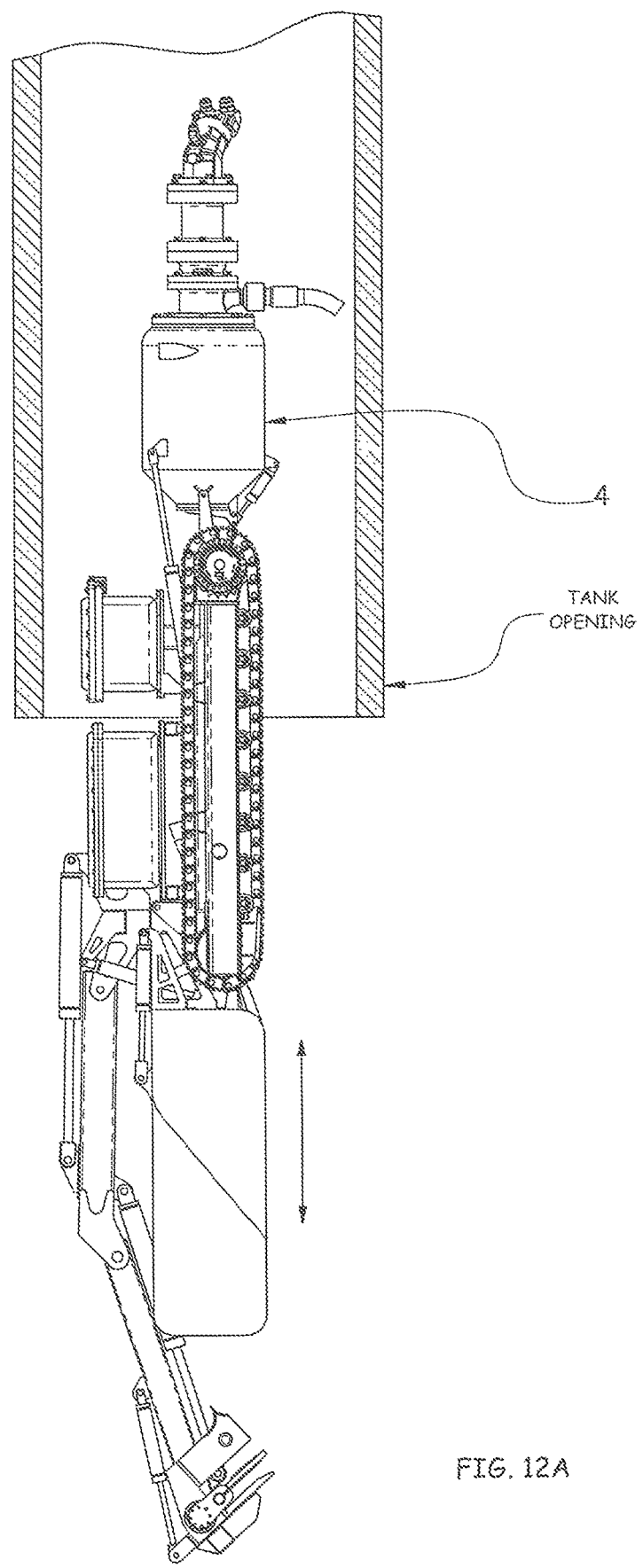
FIG. 12A is another left side view of the tank excavator of FIG. 1 with the arm and tank stowed.

FIG. 12A references a further embodiment where the pump/tank assembly 4 can also fold down to realize the minimal cross section in the stowed position. This allows the tank excavator 5 to be deployed through the smallest possible opening down to approximately 34" in diameter.

D. Track Assembly 6

Referring to FIGS. 1-6, the track assembly 6 can include parallel tank treads a first pair of wheels with a first track of parallel tank threads on a left side of the mobile vehicle, and a second pair of wheels with a second track of parallel tank threads on a right side of the mobile vehicle. The tank treads can be constructed of metal, rubber, composite, or a combination of materials. The tracks can provide mobility for the Tank Excavator with directional control via skid steering.

E. Electrical & Control

In order to be operated in hazardous environments the electrical and control systems can be designed to be hazardous/explosion proof rated. Electrical power to operate the control can be provided by fluid power (hydraulic or compressed air) operating an on-board enclosed explosion proof generator and communication for its control can be done over a fiber optic connection.

Explosion proof hydraulic valves can be placed near the opening of the tank at grade level or inside an explosion proof enclosure(s) 8 around the valve assembly on the device in the tank 5 in order to ensure the safe operation in flammable hazardous environments.

Fiber optic encoders can be located at each or some of the axis for automated or semiautomated control utilizing a signal thru fiber optic cable which does not present an ignition source for flammable gases or materials.

F. 2 Axis Articulating Nozzle 80

Figure 14:
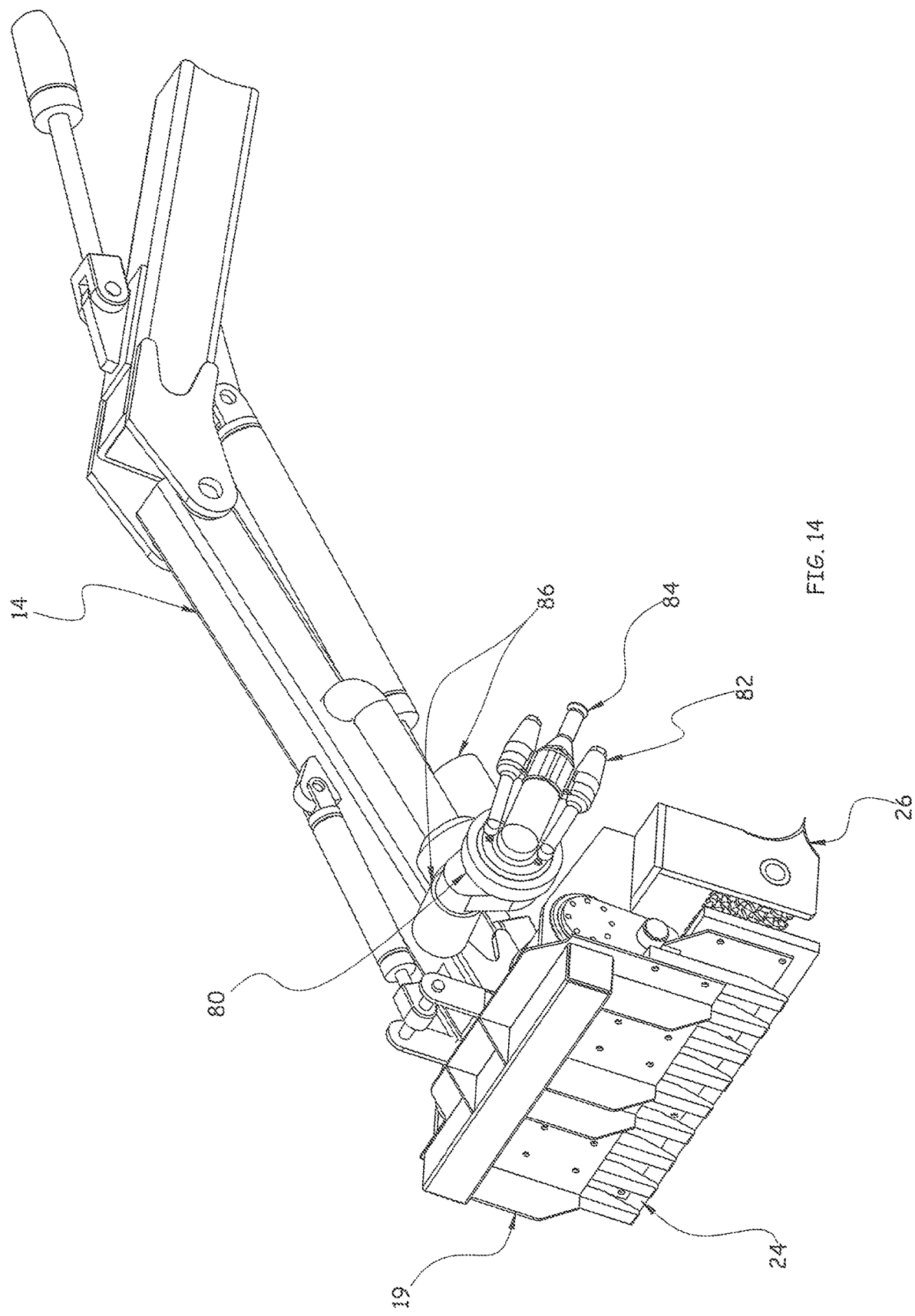
FIG. 14 is an alternate perspective view of another embodiment of the gathering arm assembly for the tank excavator of FIG. 1 with a 2 axis articulating nozzle and scraper assembly.

FIG. 14 is an alternate perspective view of another embodiment of the gathering arm assembly 1 for the tank excavator of FIG. 1 with a 2 axis articulating nozzle assembly 80 and scraper assembly 18.

Referring to FIGS. 1 and 14, an optional 2 axis articulating nozzle 80 can be mounted to the boom 14 or the gathering Arm 1. This nozzle 80 can provide a liquefier as needed in a controlled manner in order to help break up waste in tanks that can tolerate liquids or to clean/de-foul the trough of the bucket, macerator, or crusher assemblies if required.

Figure 15:
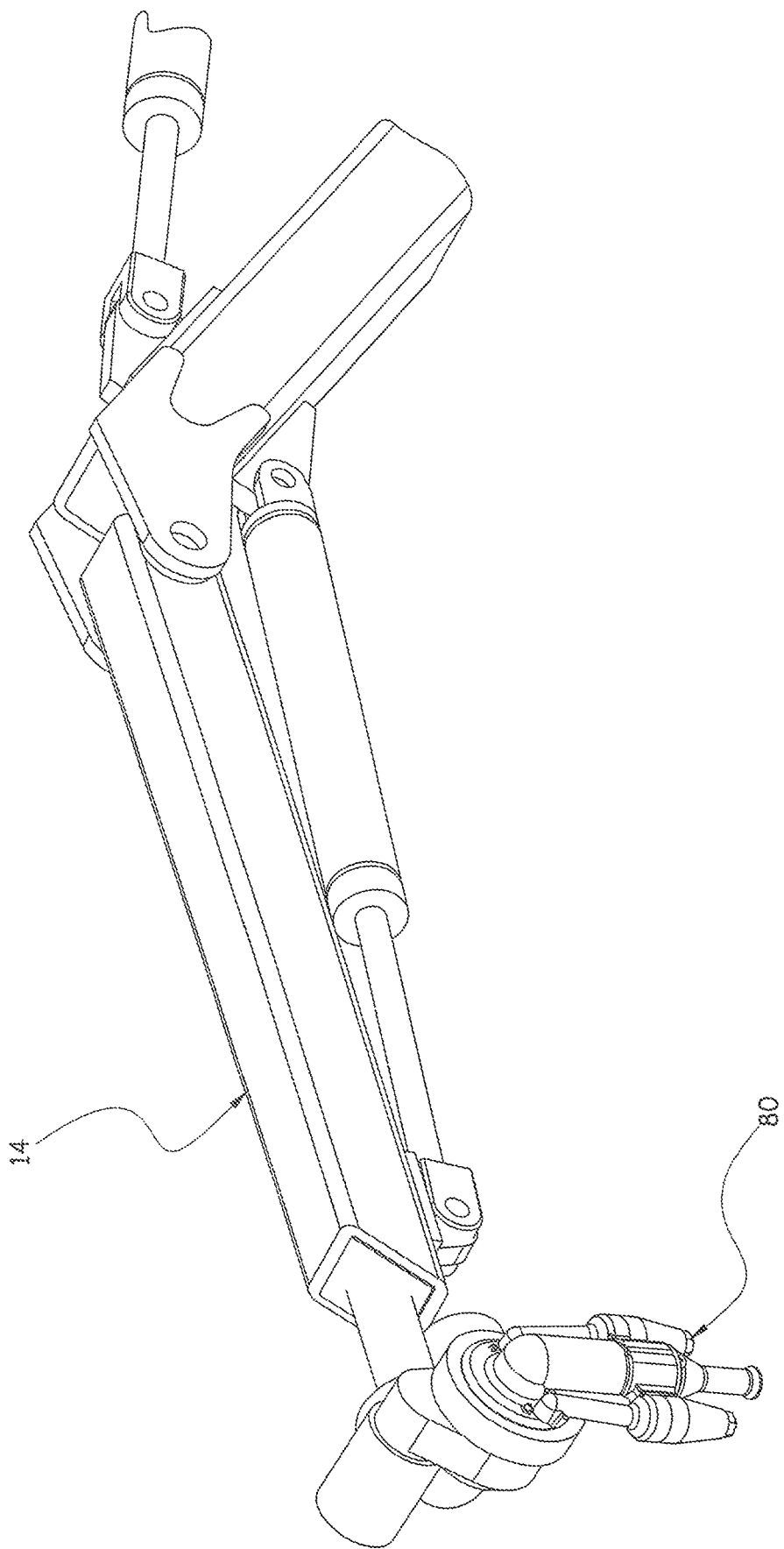
FIG. 15 is an enlarged perspective view of the gathering arm assembly with 2 axis articulating nozzle on the end of the boom of the gathering arm assembly of FIG. 14.

The 2 axis articulating nozzle 80 can be comprised of high pressure, low flow nozzles 82, low pressure, high flow nozzles 84, or a combination therein. Low pressure, high flow nozzles can operate at pressures up to, but not limited to, approximately 5000 psig and at flow rates ranging from approximately 10 to approximately 500 GPM. High pressure, low flow nozzles can operate at, but not limited to, a pressure range from approximately 5,000 psig to approximately 50,000 psig and a flow rate range from 0 to approximately 50 GPM. Each axis rotation is controlled through a hydraulic motor 86. Depending on the configuration utilized for specific applications the Articulating Nozzle 80 can be installed by itself at the end of the boom as illustrated in FIG. 15, or back from the end and coupled with another end effector, such as a scraper assembly 18, squeegee 24, crusher, or grinder assembly 26.

G. Straight or Curved Blade/Backstop

In order to improve waste collection in tanks utilizing other technologies a Straight or Curved Blade/Backstop may also be deployed. This tool allows the Tank Excavator to move material within the tank directly, as well as to direct the flow of liquid material towards existing pumps.

H. Interchangeable Tooling

The Pump/Tank, Bucket and Gathering Arm Assemblies can be attached in such a way that they can be easily removed, via remote mechanism if necessary, and changed out with a new assembly if a portion becomes inoperable or if a different tool (i.e. macerator, crusher, high pressure nozzles, backstop blade, etc.) would be more effective for the particular application.

I. Remote Pump/Tank Assembly

Figure 13:
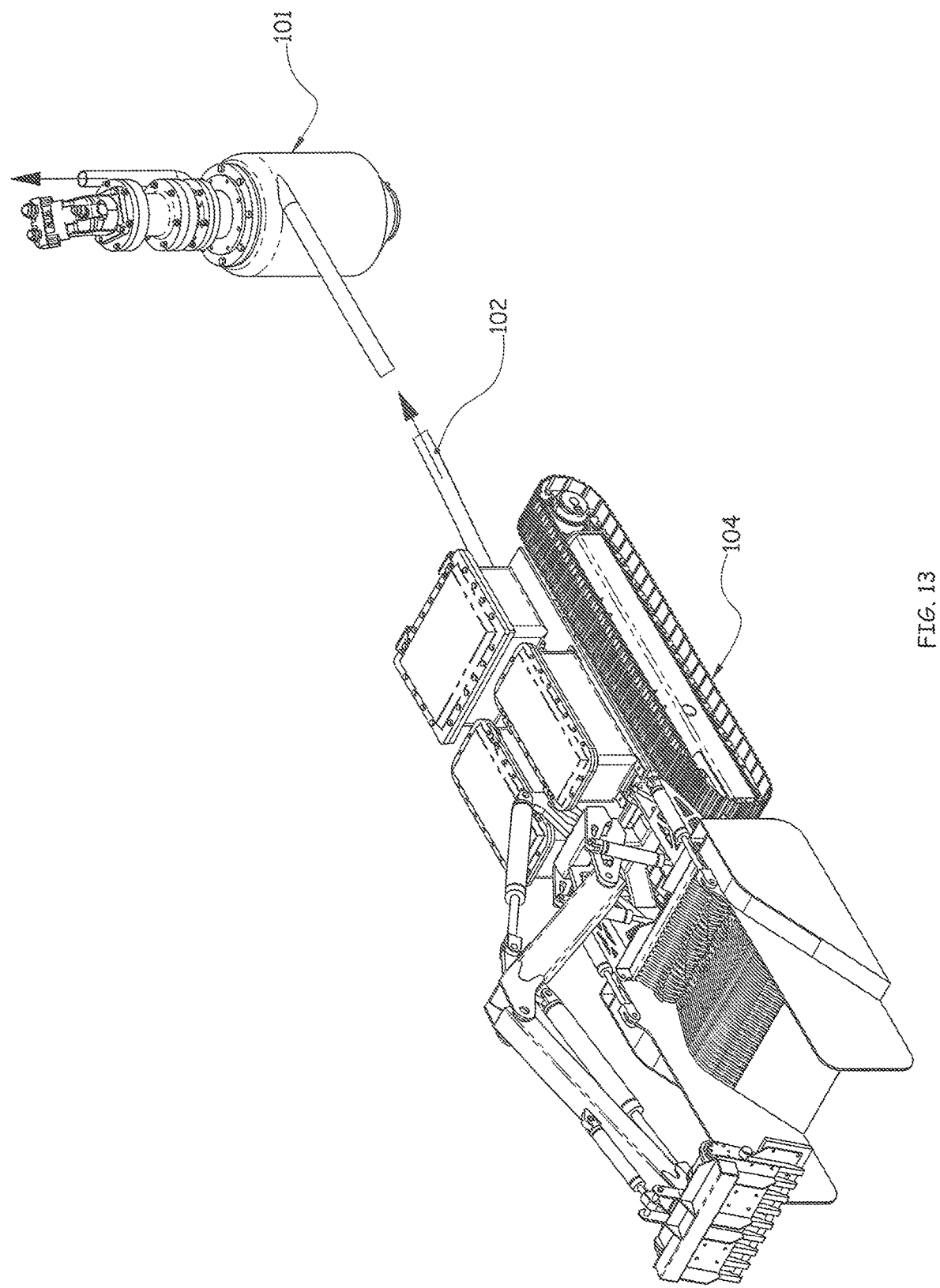
FIG. 13 is an upper perspective view of the tank excavator of FIG. 1 with a remote pump/tank assembly.

FIG. 13 is an upper perspective view of the tank excavator of FIG. 1 with a remote pump/tank assembly. Referring to. FIG. 13, a remote Pump/Tank Assembly 100 can also be optionally mounted at a fixed location within the tank, with a length of hose 102 connecting it to the Tank Excavator 104. This configuration allows for different size pumps and tanks as well as providing different mobility characteristics for the excavator.

Other technical advantages may become readily apparent to one of ordinary skill in the art after review of the following figures and description.

It should he understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A tank excavator device for cleaning contaminated tanks, comprising:
   a mobile vehicle having a front end and a rear end;
   a gathering arm assembly having a first end and a second end attached to the front end of mobile vehicle, the first end for breaking up waste from a contaminated waste tank;
   wherein the mobile vehicle includes:
   a first pair of wheels with a first track of parallel tank threads on a left side of the mobile vehicle; and
   a second pair of wheels with a second track of parallel tank threads on a right side of the mobile vehicle;
   a gathering arm assembly having a first end and a second end attached to the front end of mobile vehicle, the first end for breaking up waste from a contaminated waste tank;
   a bucket assembly on the front end of the mobile vehicle, having a receptacle for collecting the waste from the first end of the gathering arm assembly; and
   a pump and tank assembly for collecting waste material in the bottom of the contaminated waste tank with a pump.

2. The tank excavator device of claim 1, wherein the gathering arm assembly includes:
   a scraper on the first end of the gathering arm assembly; and
   a plurality of hardened tines attached to the scraper.

3. The scraper assembly of claim 2, wherein the wherein the plurality of hardened tines is reciprocated linearly up and down.

4. The tank excavator device of claim 1, wherein gathering arm assembly includes:
   a scraper with squeegee on the first end of the gathering arm assembly.

5. The tank excavator device of claim 1, wherein gathering arm assembly includes:
   a scraper with squeegee and grinding drum assembly on the first end of the gathering arm assembly.

6. The tank excavator device of claim 1, wherein the gathering arm assembly includes:
   a pivotable mast with a lower end pivotally attached to the front end of the mobile vehicle, and an upper end; and
   a boom having a first end pivotally attached the upper end of the mast, and a second end pivotally attached to a base of a scraper.

7. The tank excavator of claim 6, wherein the gathering arm assembly includes:
   a mast elevation cylinder having a lower end pivotally attached to the mobile vehicle and an upper end pivotally attached to an upper portion of the pivotable mast for controlling pivoting positions of the pivotable mast relative to the mobile vehicle; and
   a boom elevation cylinder for having a first end pivotally attached to another upper portion of the pivotal mast and a second end pivotally attached to another portion of the base of the scraper.

8. The tank excavator of claim 1, wherein the bucket assembly includes:
   pivoting arms for allowing the bucket assembly to pivot up or pivot down relative to the front end of the mobile vehicle.

9. The tank excavator of claim 8, wherein the bucket assembly includes:
   a ramp having a front end which is lowerable to rest on a surface, and a rear end that rises up to the receptacle.

10. A tank excavator device for cleaning contaminated tanks, comprising:
    a mobile vehicle having a front end and a rear end;
    a gathering arm assembly having a first end and a second end attached to the front end of mobile vehicle, the first end for breaking up waste from a contaminated waste tank;
    a bucket assembly on the front end of the mobile vehicle, having a receptacle for collecting the waste from the first end of the gathering arm assembly;
    pivoting arms for allowing the bucket assembly to pivot up or pivot down relative to the front end of the mobile vehicle;
    a pump and tank assembly adjacent a rear end of the mobile vehicle, for collecting waste material from the discharge of an eductor in the bottom of the bucket assembly in order to pump the waste material out of the waste tank;
    a scraper on the first end of the gathering arm assembly;
    a pivotable mast with a lower end pivotally attached to the front end of the mobile vehicle, and an upper end; and
    a boom having a first end pivotally attached the upper end of the mast, and a second end pivotally attached to a base of the scraper.

11. The tank excavator of claim 10, wherein the bucket assembly includes:
    a trough in the receptacle that gravity feeds a screw which feeds the collected waste material into an educator.

12. The tank excavator of claim 11, wherein the bucket assembly includes:
    a crusher in the receptacle for further breaking down the collected waste material.

13. The tank excavator of claim 11, wherein the bucket assembly includes:
    a macerator in the receptacle for further breaking down the collected waste material.

14. The tank excavator of claim 10, wherein the bucket assembly includes:
    a jet educator for pushing broken down material from the collected waste to the pump and tank assembly.

15. The tank excavator of claim 10, further comprising:
electrical and controls assembly that includes explosion proof hydraulic valves located outside the contaminated waste tank.

16. A tank excavator device for cleaning contaminated tanks, comprising:
a mobile vehicle having a front end and a rear end;
a gathering arm assembly having a first end and a second end attached to the front end of mobile vehicle, the first end for breaking up waste from a contaminated waste tank;
a bucket assembly on the front end of the mobile vehicle, having a receptacle for collecting the waste from the first end of the gathering arm assembly;
a pump and tank assembly for collecting waste material in the bottom of the contaminated waste tank with a pump;
electrical and controls assembly having onboard controls and hydraulic valves housed in explosion proof enclosures, and
communications for the electrical and controls assembly over fiber optics.

17. The electrical and controls assembly of claim 16, further comprising:
electrical power is provided by an on-board fluid powered generator.

* * * * *